United States Patent [19]

Ohara et al.

[11] Patent Number: 4,484,073
[45] Date of Patent: Nov. 20, 1984

[54] METHOD OF AND APPARATUS FOR READING OUT RADIATION IMAGE INFORMATION

[75] Inventors: Yuji Ohara; Kazuo Horikawa, both of Kanagawa, Japan

[73] Assignee: Fuji Photo Film Co., Ltd., Kanagawa, Japan

[21] Appl. No.: 316,371

[22] Filed: Oct. 29, 1981

[30] Foreign Application Priority Data

Oct. 30, 1980 [JP]  Japan ................................. 55-152814

[51] Int. Cl.$^3$ ............................................. G03C 5/16
[52] U.S. Cl. ................................ 250/327.2; 250/337; 250/347
[58] Field of Search ....................... 358/206, 208, 293; 250/327.2, 347, 234, 235, 236, 337

[56] References Cited

U.S. PATENT DOCUMENTS

| | | | |
|---|---|---|---|
| 3,835,249 | 9/1974 | Dattilo et al. ........................ | 358/285 |
| 4,258,264 | 3/1981 | Kotera et al. ..................... | 250/484.1 |
| 4,329,011 | 5/1982 | Mori et al. ........................... | 250/236 |
| 4,429,220 | 1/1984 | Noguchi .............................. | 250/236 |

Primary Examiner—Alfred E. Smith
Assistant Examiner—Carolyn E. Fields
Attorney, Agent, or Firm—Sughrue, Mion, Zinn, Macpeak and Seas

[57] ABSTRACT

In a system for reading out radiation image information recorded on a stimulable phosphor sheet which emits light upon stimulation by stimulating rays according to the recorded radiation image information, the phosphor sheet is two-dimensionally scanned by a laser beam and the light emitted therefrom is detected by a photodetector. The integrated output of the photodetector is read out for every unit of time period corresponding to a picture element of the radiation image. Position reference pulses are generated every time the relative position of the laser beam scans on the phosphor sheet by a standard amount in the main scanning direction. The integrated value of the output of the photodetector is read out every time the output is integrated for a fixed time period within each time interval between the position reference pulses.

6 Claims, 13 Drawing Figures

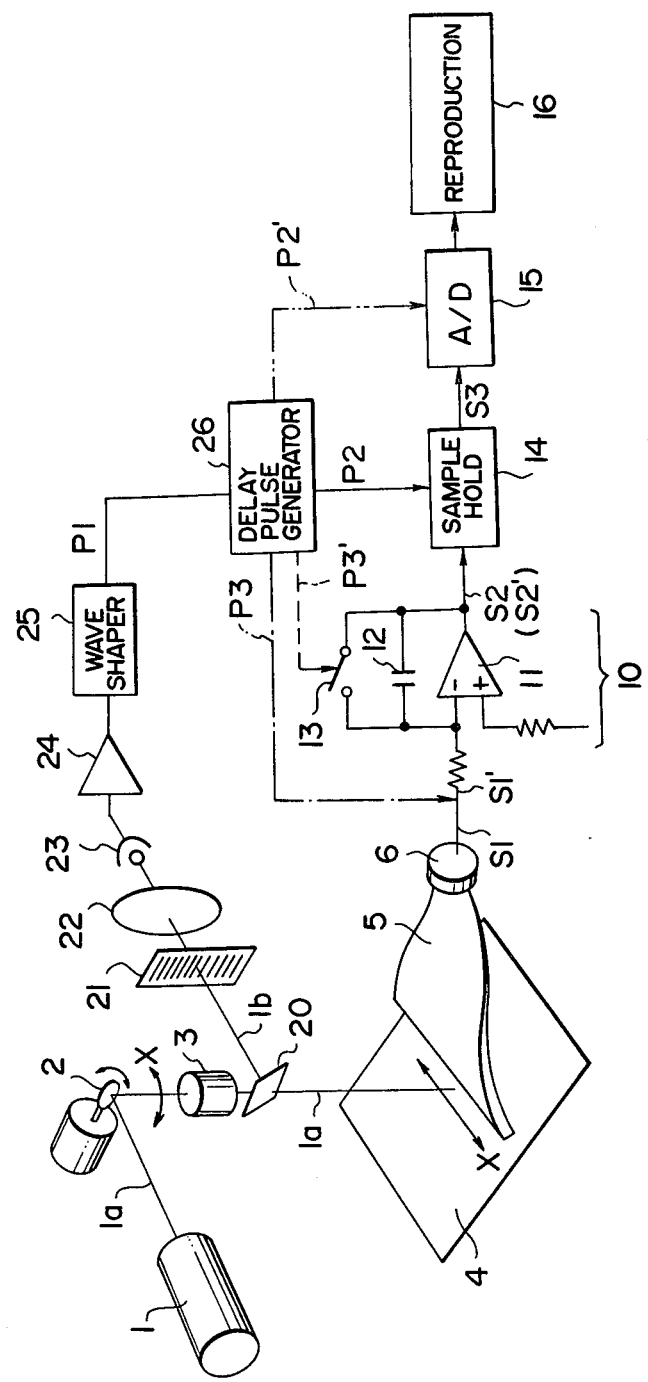
F I G. 1

F I G. 2A
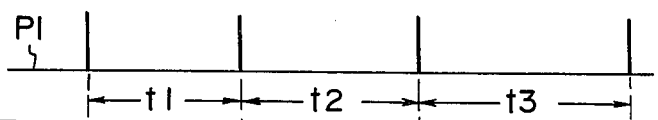
F I G. 2B
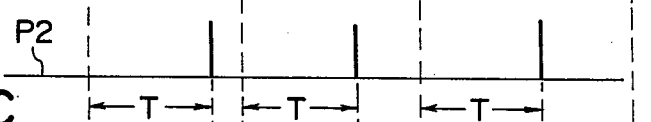
F I G. 2C
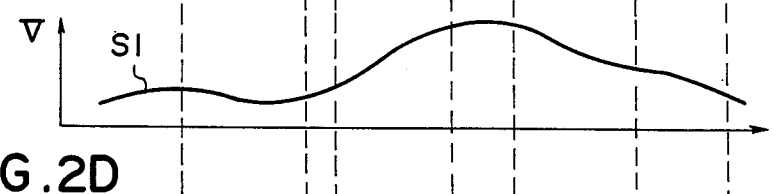
F I G. 2D
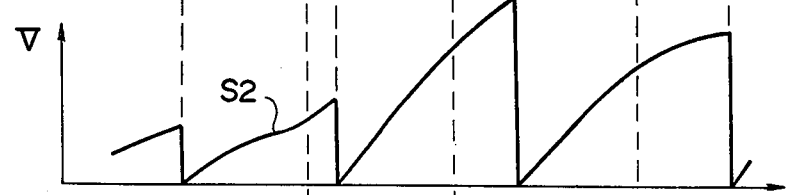
F I G. 2E

METHOD OF AND APPARATUS FOR READING OUT RADIATION IMAGE INFORMATION

BACKGROUND OF THE INVENTION

1. Field of the Invention

This invention relates to a method of and apparatus for reading out radiation image information recorded in a stimulable phosphor sheet, and more particularly to a method of and apparatus for reading out image information stored in a stimulable phosphor sheet in the form of a radiation energy pattern by stimulating the stimulable phosphor sheet with a two-dimensionally scanning laser beam and detecting light emitted from the phosphor sheet upon stimulation by use of a photo-electric detecting means such as a photomultiplier.

2. Description of the Prior Art

It is known in the art that a stimulable phosphor is able to store radiation source energy of a radiation such as X-ray, alpha ray, beta ray, gamma ray, ultraviolet ray, etc. when it is exposed to the radiation and that it emits the stored energy in the form of light when it is exposed to stimulating rays. Therefore, it is possible to temporarily record a radiation image on a stimulable phosphor in the form of a pattern on the stored radiation energy and read out the recorded image by exposing the stimulable phosphor to stimulating rays to have the stimulable phosphor emit light and photo-electrically detecting the light emitted from the stimulated phosphor.

For instance, as disclosed in U.S. Pat. No. 4,258,264, it is possible to first record an X-ray image of a subject matter such as a human body on a stimulable phosphor sheet by exposing the stimulable phosphor sheet to X-rays transmitting through the subject matter, and then read out the recorded image by two-dimensionally scanning the phosphor sheet with a laser beam to cause the phosphor sheet to emit light according to the recorded image and photo-electrically detecting the emitted light by use of a photodetector. Thus, the radiation image information is converted to a time series image signal.

Since the light emitted from the stimulable phosphor sheet upon stimulation thereof has no directivity and has very low intensity, it is desirable to integrate the output of the photodetector such as a photomultiplier for every short time period unit corresponding to the picture element of the image.

In the above-mentioned system, a laser beam scanning apparatus is employed. In the laser beam scanning apparatus, a mechanical light deflector such as a rotating polygon mirror or a galvanometer mirror is used for deflecting the laser beam in the main-scanning direction and the stimulable phosphor sheet is moved in the sub-scanning direction. Further, as a clock for the reading out operation, clock pulses generated by a quartz oscillator at equal intervals are generally used. However, it is technically very difficult to cause the laser beam scan strictly at a constant speed by use of the mechanical light deflector. Particularly when a reciprocal mechanism such as a galvanometer mirror driven by a saw tooth wave is employed, it is very difficult to make the scanning speed strictly constant. Consequently, in the finally obtained visible image reproduced by use of the image signal output from the photodetector, there appear jitters or unevenness in density which markedly deteriorate the quality of the reproduced image.

SUMMARY OF THE INVENTION

In view of the above-mentioned drawback inherent in the conventional scanning read out system, it is the primary object of the present invention to provide a method of reading out the radiation image information from a stimulable phosphor sheet which results in a reproduced image of the radiation of high quality free from jitters or uneven density even when the scanning speed of a scanning laser beam is not constant on the phosphor sheet.

Another object of the present invention is to provide an apparatus for carrying out the above method of the invention.

The above mentioned objects of the present invention are accomplished by generating position reference pulses every time the relative position of the laser beam to the stimulable phosphor sheet changes by a standard amount in the main-scanning direction in the course of scanning of the phosphor sheet with the laser beam to cause the phosphor sheet to emit light, and reading out an integrated output from the photodetector which is integrated for a fixed time period during each time period between adjacent position reference pulses.

In accordance with the present invention as summarized above, since the output of the photodetector is integrated for a fixed time period in each time interval between the position reference pulses regardless of the scanning speed, the image finally reproduced by use of the read out image signal is free from jitters and uneven density and has markedly high image quality.

In order to read out the integrated output which is integrated for a fixed time period, it is possible either to integrate the output for the fixed time period or to take out the integrated output which is refreshed in every time interval when the fixed time period has lapsed from the start of the time interval. Further, in order to make the integrating time constant, it is possible either to make the operation time of the integrator constant and refresh the integrated output after the constant integrating time, or to refresh the output at the end of the time interval between position reference pulses and transmit the output of the photodetector to the integrator only for the fixed time period.

BRIEF DESCRIPTION OF THE DRAWING

FIG. 1 is a schematic representation of an embodiment of the radiation image information reading out apparatus in accordance with the present invention, FIGS. 2A to 2E are graphs showing timings of various signals employed or obtained in one embodiment of the present invention.

DESCRIPTION OF THE PREFERRED EMBODIMENTS

Figure 3A:
FIGS. 3A to 3F are graphs showing timings of various signals employed or obtained in another embodiment of the present invention.

Now the present invention will be described in detail with reference to FIG. 1. Referring to FIG. 1, a laser beam 1a is generated from a laser source 1. The laser beam 1a is deflected in the X-direction by a galvanometer mirror 2 and is caused to scan on a stimulable phosphor sheet 4 in the X-direction being focused through a lens 3. The stimulable phosphor sheet 4 carries a stored radiation image information which has already been recorded in a recording step, and accordingly emits light when it is scanned by the laser beam 1a. The emitted light is collected by a light transmitting sheet 5 which has an entrance face extending along the scanning line on the phosphor sheet 4 and an annular exit face provided adjacent to the light receiving face of a photomultiplier 6 and is introduced into the photomultiplier 6 to be converted to an electric signal.

Since the intensity of the light emitted from the stimulated phosphor sheet is very low, the output level of the photomultiplier 6 is very low and accordingly, it is necessary that the output of the photomultiplier be integrated so as to be used for reproducing a visible image. The output of the photomultiplier 6 is, therefore, integrated by an integrator 10 which consists of an operational amplifier 11, an integrating capacitor 12 connected in parallel with the operational amplifier 11 and an ON-OFF switch 13 connected in parallel with the capacitor 12. The output of the integrator 10 is input into a sample holding circuit 14, and the output of the circuit 14 is input into an A/D converter 15, from which a digital value is sent to a reproducing device 16 such as a display or a copier.

On the other hand, a portion 1b of the laser beam 1a is taken out of the focused laser beam 1a directed to the phosphor sheet 4 after passing through the lens 3 by a semi-transparent mirror 20 and is introduced onto a linear encoder 21. The linear encoder 21 is, for instance, a transparent plate as of glass provided with opaque portions and transparent portions arranged alternately in stripes with a fixed pitch. The laser beam 1b passing through the transparent portions of the linear encoder 21 is received by a photodetector 23 by way of a condenser lens 22. The output of the photodetector 23 is amplified by an amplifier 24 and then the waveform thereof is shaped by a waveform shaper 25. The waveform-shaped pulses thus obtained are output from the shaper 25. By use of the position reference pulses P1, the image signal is controlled of its transmission and the reproduced image is made free from the jitter.

The position reference pulses P1 is input into a delay pulse generator 26 which generates pulses P2 delayed from the position reference pulses by a fixed time interval T. The output pulses P2 are input into the sample holding circuit 14 to control the timing of sample holding. The ON-OFF switch 13 for resetting the integrator 10 is closed in response to the position reference pulses P1 to repeat integrations for every position reference pulses P1. The timing relationship between the signals is as shown in FIGS. 2A to 2E. Thus, the integrated value of the output of the photodetector 23 integrated for the time period T is obtained as the output S3 of the sample holding circuit 14.

Referring to FIGS. 2A to 2E, the time intervals between the position reference pulses P1 (FIG. 2A) are different from each other since the scanning speed on the phosphor sheet 4 is not constant as indicated by t1, t2 and t3. The delay pulses P2 are generated after lapse of the time period T from the position reference pulses P1 (FIG. 2B). The image signal S1 output from the photodetector 23 (FIG. 2C) is integrated for every time interval between the position reference pulses P1 (FIG. 2D) to obtain the integrated signal S2. The integrated signal S2 is converted to a digital signal S3 for every fixed time period T (FIG. 2E).

Figure 3B:
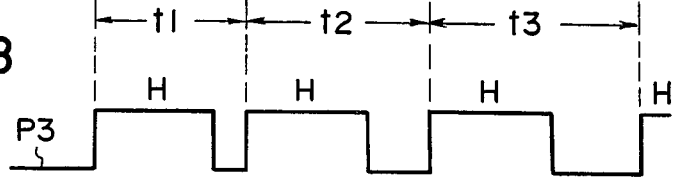
Figure 3C:
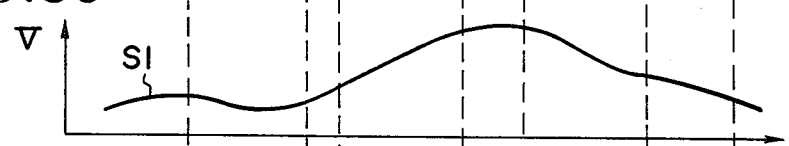
Figure 3D:
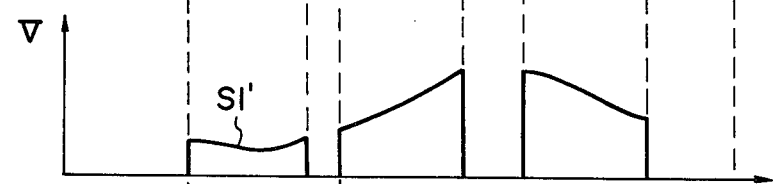
Figure 3E:
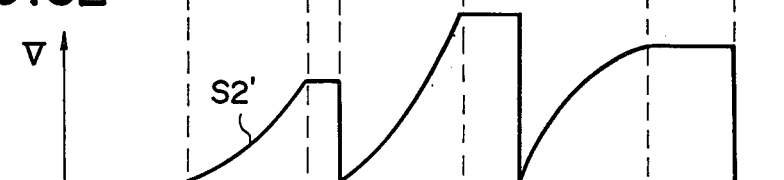
Figure 3F:
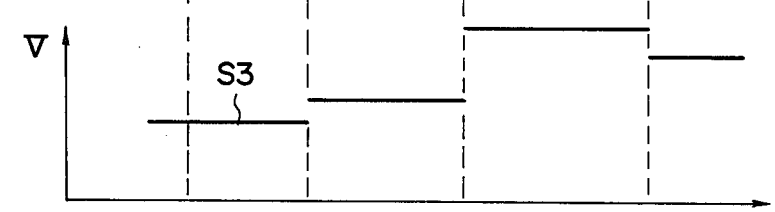
Figure 4:
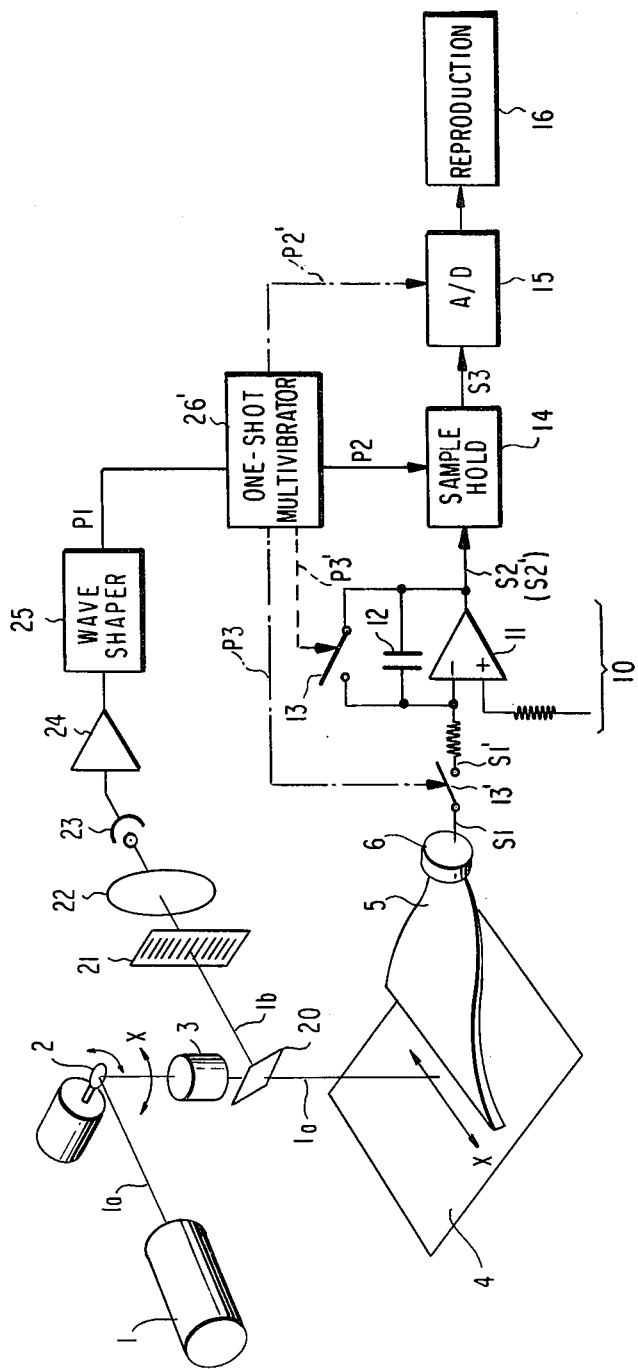
FIG. 4 is a schematic representation of a second embodiment of the radiation image information reading out apparatus in accordance with the present invention.

It will be noted that the present invention is not limited to the above-mentioned embodiment but may be carried out in various other possible embodiments. For instance, in the above embodiment the delay pulse generator 26 generates delayed pulses P2 which are delayed from the position reference pulses P1 by the fixed time period Y, and the integrated value between the pulses is integrated. However, as shown in FIG. 4 the delay pulse generator 26 may be substituted by a one-shot multivibrator 26' which generates pulses P3 having a fixed width as shown in FIG. 3B. Pulses P3 may be input into the output portion of the photomultiplier 6 e.g. into an analogue switch S1' connected to the output of the photomultiplier 6 so as to convert the output S1 of the photomultiplier 6 to an output signal S1' which is turned ON only for the fixed time period T as shown in FIG. 3D and is integrated for every time period. In FIG. 4 all other components correspond to the embodiment of FIG. 1. In this case, the output of the integrator 10 becomes as represented by S2' in FIG. 3E. The integrated output S2' is then subjected to sample holding to obtain a value S3 as shown in FIG. 3F.

Alternatively, as shown in FIG. 4 at P3', the output P3 of the one-shot multivibrator 26' is connected to the integration resetting switch 13 so that the switch 13 may be opened for the time period during which the output P3 of the one-shot multivibrator is of the high level H (FIG. 3B) for integration and closed for the rest time period so as not to integrate the output.

Further, it is also possible to input the delay pulse P2 into the A/D converter 15 as shown at P2' in FIG. 1. In this case, the integrated value is converted to a digital value when the fixed time period T has lapsed. This also results in the same output as said integrated value S3.

It will also be noted that the integrated value may be converted to a final image signal by not using the sample holding circuit, but any other known electric means or circuit can be used for this purpose.

We claim:

1. A method of reading out radiation image information recorded on a stimulable phosphor sheet by exposing the stimulable phosphor sheet to a laser beam which scans on the phosphor sheet in the main scanning and sub-scanning directions to cause the phosphor sheet to emit light according to the recorded radiation image information and photo-electrically detecting the emitted light by use of a photodetector, wherein said method comprises generating position reference pulses every time the relative position of said laser beam to said phosphor sheet changes in the main scanning direction by a standard amount, and reading out an integrated value of the output of said photodetector integrated for a fixed time period within each time interval between said position reference pulses, 2. An apparatus for reading out radiation image information recorded on a stimulable phosphor sheet comprising a reading out laser beam source for generating a laser beam, scanning means for causing said laser beam to scan on a stimulable phosphor sheet carrying thereon radiation image information in the main and sub-scanning directions, a photodetector for detecting light emitted from said stimulable phosphor sheet stimulated by said laser beam scanning thereon according to the radiation image information recorded thereon, an integrator for integrating the output of said photodetector, means for generating position reference pulses every time the relative position of said laser beam to said phosphor sheet changes by a standard amount in the main scanning direction, and means for reading out an integrated value of the output of said photodetector integrated by said integrator for a fixed time period within the time period defined between said position reference pulses.

3. An apparatus as defined in claim 2 wherein said means for generating position reference pulses comprises a linear encoder, means for splitting said laser beam into portions and directing a split portion of the laser beam to scan on said linear encoder, and means for detecting the laser beam passing through the linear encoder.

4. An apparatus as defined in claim 2 wherein said reading out means comprises a delay pulse generator connected with said position reference pulse generating means for generating delay pulses delayed from said position reference pulses by a fixed time period, and a sample holding circuit connected with said integrator for sample-holding the integrated output of the integrator integrated for a time period from said position reference pulses to said delay pulses.

5. An apparatus as defined in claim 2 wherein said reading out means comprises a one-shot multivibrator connected with said position reference pulse generating means for generating pulses having a width of a fixed time period, and an analogue switch connected with the output of said photodetector being turned on only during the time period of said width of the pulses from the one-shot multivibrator.

6. An apparatus as defined in claim 2 wherein said reading out means comprises a one-shot multivibrator connected with said position reference pulse generating means for generating pulses having a width of a fixed time period, and an integration resetting switch means connected with said integrator for resetting the integration being operated by said pulses from the one-shot multivibrator.

* * * * *